(12) United States Patent
Wu et al.

(10) Patent No.: US 12,295,498 B2
(45) Date of Patent: May 13, 2025

(54) ACOUSTIC CHAIR COVE

(71) Applicant: Google LLC, Mountain View, CA (US)

(72) Inventors: Christine Jean Wu, San Francisco, CA (US); Shokofeh Darbari, Palo Alto, CA (US); Shane Anton Myrbeck, Los Angeles, CA (US); Caitlin Emily Riggs, San Francisco, CA (US); Jack Godfrey Wood, San Francisco, CA (US); Andy Furner, London (GB); Harc Lee, London (GB)

(73) Assignee: GOOGLE LLC, Mountain View, CA (US)

( * ) Notice: Subject to any disclaimer, the term of this patent is extended or adjusted under 35 U.S.C. 154(b) by 88 days.

(21) Appl. No.: 18/091,815

(22) Filed: Dec. 30, 2022

(65) Prior Publication Data

US 2024/0215730 A1 Jul. 4, 2024

(51) Int. Cl.
*A47C 7/66* (2006.01)
*A47C 7/72* (2006.01)

(52) U.S. Cl.
CPC ............... *A47C 7/727* (2018.08); *A47C 7/66* (2013.01); *A47C 7/666* (2018.08)

(58) Field of Classification Search
CPC ............ A47C 7/727; A47C 7/66; A47C 7/666
See application file for complete search history.

(56) References Cited

U.S. PATENT DOCUMENTS

| | | | | |
|---|---|---|---|---|
| 4,440,443 A | * | 4/1984 | Nordskog | B60N 2/882 297/217.4 |
| 4,826,245 A | * | 5/1989 | Entratter | A47C 3/18 248/917 |
| 5,838,808 A | * | 11/1998 | Prosser | H04R 5/023 381/388 |
| 6,656,137 B1 | * | 12/2003 | Tyldsley | A61M 21/00 472/60 |
| 8,845,016 B2 | * | 9/2014 | Domash | A47C 7/727 248/125.7 |
| 9,449,591 B2 | * | 9/2016 | Domash | A47C 7/727 |
| 9,603,457 B2 | * | 3/2017 | Massaud | A47C 7/70 |
| 9,930,434 B2 | * | 3/2018 | Domash | A47C 7/38 |
| 10,188,215 B2 | * | 1/2019 | Massaud | A47C 7/727 |

(Continued)

FOREIGN PATENT DOCUMENTS

| | | | | |
|---|---|---|---|---|
| CN | 106572421 A | * | 4/2017 | ............ A47C 7/727 |
| CN | 110236318 A | * | 9/2019 | ............ A47C 7/727 |

(Continued)

OTHER PUBLICATIONS

International Search Report and Written Opinion for Application No. PCT/US2023/086421, mailed Apr. 11, 2024, 11 pages.

*Primary Examiner* — Rodney B White
(74) *Attorney, Agent, or Firm* — DORITY & MANNING P.A.

(57) ABSTRACT

An acoustic chair cove includes a lower cove mountable on a chair such that a first wing of the lower cove is positioned at a first side of the chair, a second wing of the lower cove is positioned at a second side of the chair, and a top portion of the lower cove is positioned at a top portion of a back of the chair. An upper cove is mounted to the lower cove such that the upper cove is selectively movable relative to the lower cove between a retracted configuration and an extended configuration.

20 Claims, 4 Drawing Sheets

(56) References Cited

U.S. PATENT DOCUMENTS

| | | | |
|---|---|---|---|
| 10,537,179 B2 * | 1/2020 | Richardson | A47C 7/72 |
| 11,147,383 B2 * | 10/2021 | Lucas | A47C 17/04 |
| 11,998,121 B2 * | 6/2024 | Park | A47C 15/004 |
| 2006/0285697 A1 * | 12/2006 | Nishikawa | G10K 11/17835 |
| | | | 381/71.1 |
| 2008/0111408 A1 * | 5/2008 | Duran | A47C 7/727 |
| | | | 297/217.3 |
| 2018/0099753 A1 * | 4/2018 | Hall, Jr. | B64D 11/0606 |
| 2019/0125087 A1 * | 5/2019 | Aizawa | A47C 1/02 |
| 2021/0266427 A1 * | 8/2021 | Kidakarn | H04N 23/57 |
| 2022/0047084 A1 * | 2/2022 | Chalfin | H04R 5/023 |
| 2022/0125207 A1 * | 4/2022 | Lerner | A47C 7/666 |
| 2022/0324356 A1 * | 10/2022 | Lee | A47C 7/725 |
| 2022/0395101 A1 * | 12/2022 | Park | B60N 2/879 |
| 2023/0157454 A1 * | 5/2023 | Billman | A47C 7/666 |
| | | | 297/184.11 |
| 2024/0108143 A1 * | 4/2024 | Nakaura | A47C 7/021 |
| 2024/0138574 A1 * | 5/2024 | Lemer | A47C 7/666 |

FOREIGN PATENT DOCUMENTS

| | | | | |
|---|---|---|---|---|
| CN | 115606952 A | * | 1/2023 | A47C 7/66 |
| DE | 19545850 A1 | * | 6/1997 | A47C 1/14 |
| DE | 19607271 A1 | * | 8/1997 | A47C 1/14 |
| DE | 19754724 A1 | * | 6/1999 | A47C 1/14 |
| DE | 10128112 A1 | * | 12/2002 | A47C 15/00 |
| DE | 202009002043 U1 | * | 9/2009 | A61M 21/02 |
| DE | 202013011514 U1 | * | 4/2014 | A47C 1/14 |
| DE | 102020004109 A1 | * | 1/2022 | A47C 7/66 |
| EP | 2725575 A1 | * | 4/2014 | B60N 2/879 |
| EP | 2910429 A1 | * | 8/2015 | A47C 7/72 |
| EP | 2911412 A1 | * | 8/2015 | A47C 7/72 |
| FI | 20196020 A1 | * | 5/2021 | A47C 7/727 |
| GB | 2501538 A | * | 10/2013 | A47B 83/001 |
| GB | 2513857 A | * | 11/2014 | A47C 1/14 |
| JP | 7018178 B1 | * | 2/2022 | |
| KR | 20070102058 A | * | 10/2007 | A47C 7/66 |
| KR | 20220005266 A | * | 1/2022 | A47C 7/727 |
| KR | 20220038231 A | * | 3/2022 | A47C 7/727 |
| WO | WO-2008038620 A1 | * | 4/2008 | A61G 10/023 |
| WO | WO-2013160647 A1 | * | 10/2013 | A47B 83/001 |
| WO | WO-2016005712 A1 | * | 1/2016 | A61G 10/00 |

\* cited by examiner

ACOUSTIC CHAIR COVE

FIELD

The present disclosure relates generally to chairs with acoustic and/or visual barrier features, e.g., for shared workspaces.

BACKGROUND

Modern workspaces frequently include open floorplans with numerous desks disposed within shared spaces. In some open floorplans, low partitions are provided between adjacent desks. In other open floorplans, no partitions are provided between adjacent desks. Thus, privacy between adjacent workspaces can be limited, which can reduce productivity in some situations.

Shared workspaces can also be noisy working environments. For example, talking coworkers can be a significant source of ambient noise in shared workspaces. Coworkers can also generate significant noise by listening to music, tapping objects, and other actions. Certain workers in shared workspaces can find the ambient noise level inherent in such arrangements distracting. Thus, noisy shared workspaces can be difficult for some workers and limit productivity.

Calls and video conferencing are ubiquitous for modern workers and can be a significant source of noise in shared workspaces. To avoid distracting coworkers, some workers move to meeting or conference spaces for calls and video conferencing. However, meeting and conference spaces are frequently limited and highly demanded in modern workspaces. Thus, moving to meeting or conference spaces for calls and video conferencing can occupy valuable real estate within shared workspaces.

A chair with features for reducing ambient noise and/or with features for reducing demand for meeting or conference spaces would be useful.

SUMMARY

Aspects and advantages of embodiments of the present disclosure will be set forth in part in the following description, or may be learned from the description, or may be learned through practice of the embodiments.

Aspects of the present disclosure are directed to an acoustic chair cove that includes a lower cove mountable on a chair such that a first wing of the lower cove is positioned at a first side of the chair, a second wing of the lower cove is positioned at a second side of the chair, and a top portion of the lower cove is positioned at a top portion of a back of the chair. An upper cove is mounted to the lower cove such that the upper cove is selectively movable relative to the lower cove between a retracted configuration and an extended configuration. A top portion of the upper cove is positioned further from the top portion of the lower cove in the extended configuration and is positioned closer to the top portion of the lower cove in the retracted configuration.

Aspects of the present disclosure are also directed to an acoustic chair assembly. The assembly includes a chair. A U-shaped lower cove is mounted on the chair such that a first wing of the lower cove is positioned at a first side of the chair, a second wing of the lower cove is positioned at a second side of the chair, and a top portion of the lower cove is positioned at a top portion of a back of the chair. A U-shaped upper cove is mounted to the lower cove such that the upper cove is selectively movable relative to the lower cove between a retracted configuration and an extended configuration. The upper cove is movable by no less than fifteen centimeters between the extended and retracted configurations.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both").

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

Generally, the present disclosure is directed to an acoustic chair cove. The acoustic chair cove may be easily attachable to conventional office chairs. The acoustic chair cove may be adjustable to selectively provide acoustic and/or visual barriers. When the acoustic and/or visual barriers are deployed, the acoustic chair cove may facilitate work productivity, such as collaboration by facilitating calls and/or video conferencing with reduced disruption of adjacent coworkers. Thus, the acoustic chair cove may advantageously improve focus and/or productivity in open office spaces, and, e.g., reduce demand for meeting rooms for calls and/or video conferencing.

Figure 1:
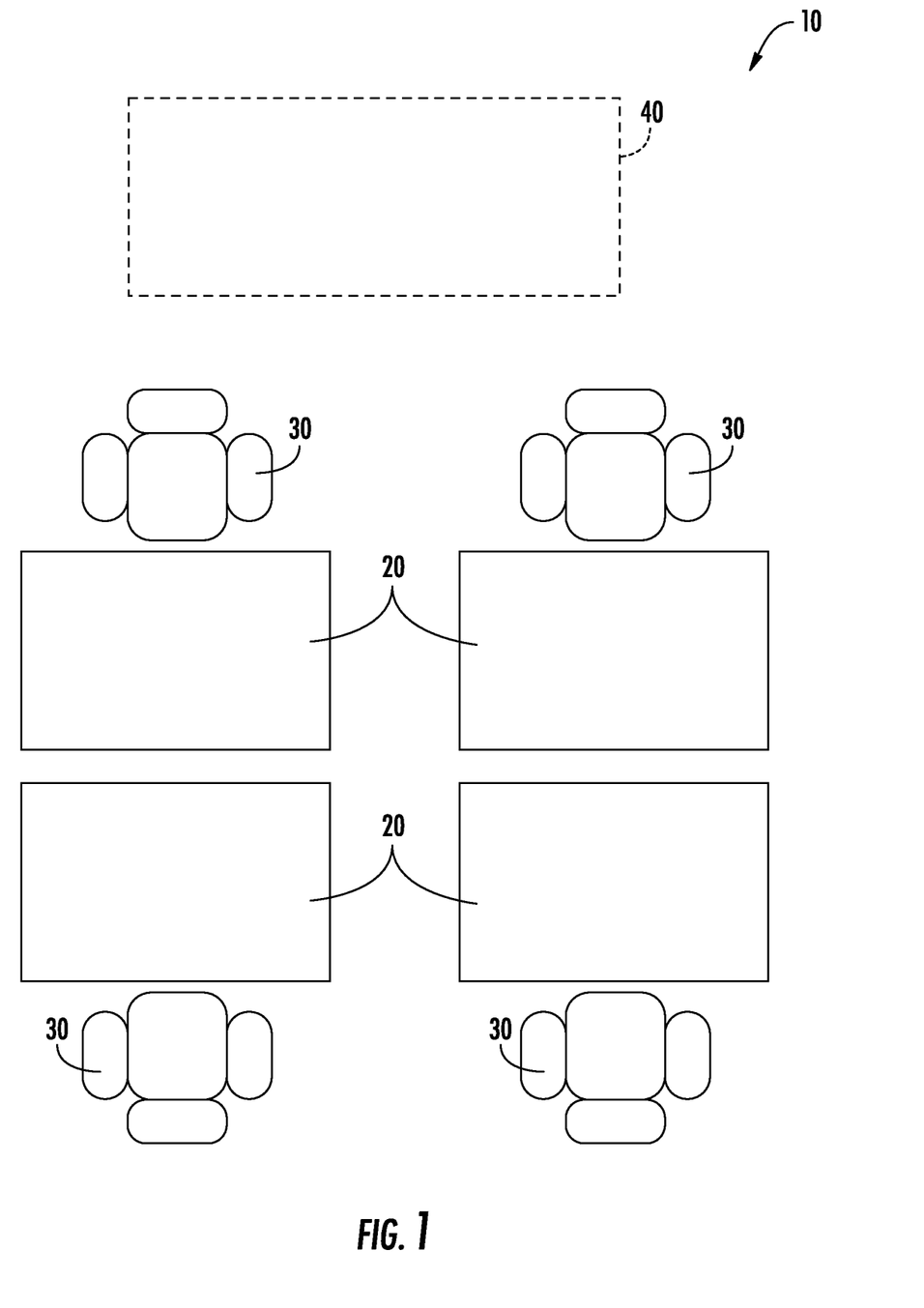
FIG. 1 is a top plan view of a workspace and a system for acoustic behavior feedback according to an example embodiment of the present subject matter.

FIG. 1 is a top plan view of a workspace 10 according to an example embodiment of the present subject matter. As shown in FIG. 1, workspace 10 may include a plurality of desks 20 and a plurality of chairs 30, at which workers may conduct various tasks. Desks 20 may be suitable desks, such as standing desks and/or sitting desks, and chairs 30 may be suitable chairs, such as rolling office chairs and/or stools.

Desks 20 and chairs 30 may be distributed within workspace 10. For instance, the desks 20 and chairs 30 within workspace 10 may be arranged in rows and/or columns. In the example embodiment shown in FIG. 1, desks 20 include four (4) desks 20, and chairs 30 include four (4) chairs 30. In some example embodiments, workspace 10 may each include no less than four (2) desks 20 and chairs 30 and no greater than fifty (50) desks 20 and chairs 30. It will be understood that the arrangement and number of desks 20 and chairs 30 shown in FIG. 1 is provided by way of example only and that the present subject matter may be used in or with other suitable arrangement and number of desks 20 and chairs 30 in alternative example embodiments.

The sizing of workspace 10 may be varied. For instance, in example embodiments, workspace 10 may be no less than ten square meters (10 m²) and no greater than five hundred square meters (500 m²), such as about one hundred square meters (100 m²). Moreover, workspace 10 may be laid out in an "open office" floor plan for desks 20 and chairs 30. The desks 20 and chairs 30 may also be laid out with the assumption that workers are desks 20 and chairs 30 in workspace 10 may frequently conduct calls, such as telephone calls or video calls.

User productivity within workspace 10 may be significantly affected by ambient noise. Thus, as discussed in greater detail below, chairs 30 may include features for reducing ambient noise. Workers sitting in chairs 30 may thus work with increased productivity, e.g., relative to working in conventional chairs.

The workspace 10 may also include one or more meeting or conference spaces 40, which are indicated schematically in FIG. 1. The conference space 40 may be separate from the desks 20 and chairs 30 in the workspace 10. For example, conference space 40 may be enclosed within a room separate from the space with the desks 20 and chairs 30. The conference space 40 may include a table and chairs arranged in a conventional manner for meetings, conferences, etc. with a group of workers.

Demand for conference space 40 may exceed availability in some instances. Thus, as discussed in greater detail below, chairs 30 may include features for reducing demand for the conference space 40, e.g., by decreasing noise to and/or from a worker in chairs 30 during calls or video conferences.

Figure 2:
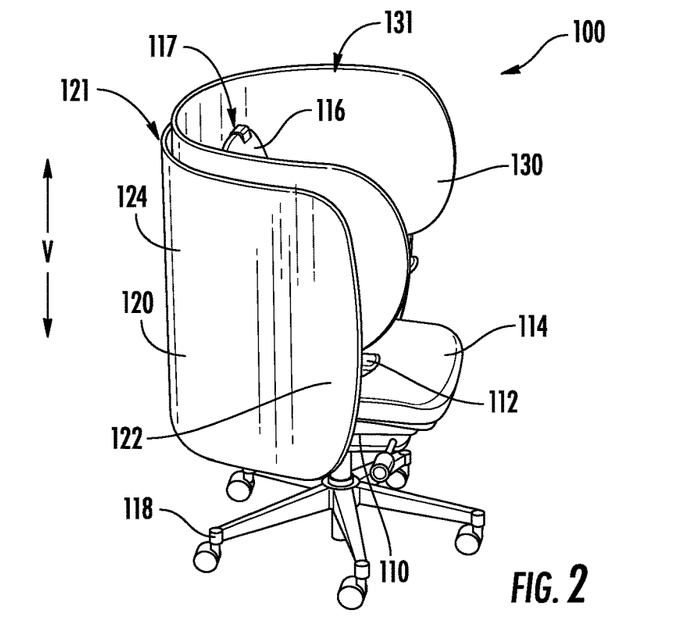
FIG. 2 is a perspective view of an acoustic chair cove according to an example embodiment of the present subject matter, with an upper cove in a retracted configuration.
Figure 3:
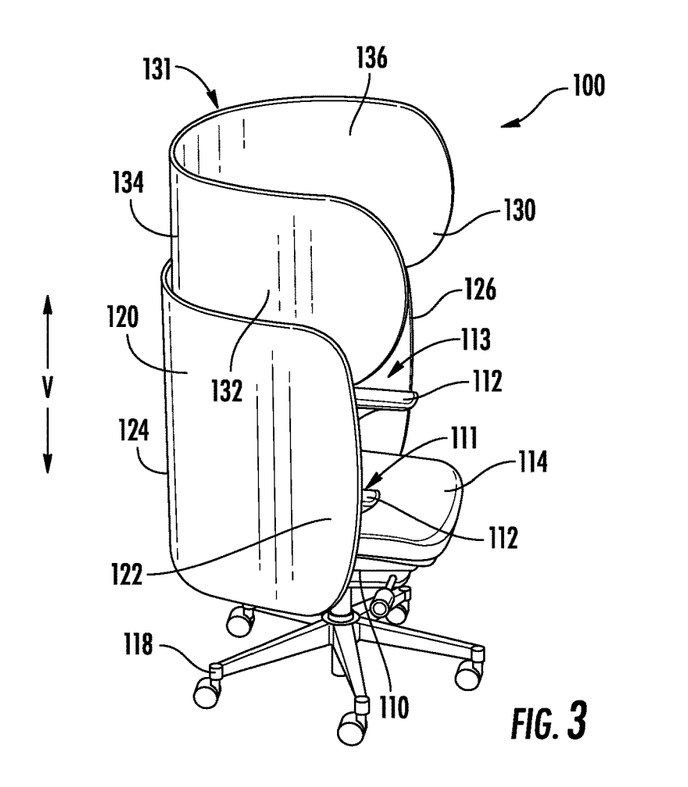
FIG. 3 is a perspective view of the example acoustic chair cove of FIG. 2, with the upper cove in an extended configuration.

FIGS. 2 and 3 are perspective views of an acoustic chair cove 100 according to an example embodiment of the present subject matter. As shown in FIGS. 2 and 3, acoustic chair cove 100 may be mounted on a chair 110, such as one of chairs 30. Chair 110 may be configured as a rolling office chair in certain example embodiments. Chair 110 may include a pair of arm rests 112, a seat 114, a back 116, and a wheeled base 118, which may be assembled and arranged in a conventional manner. Thus, e.g., a user may sit on seat 114 with arms on arm rests 112, and the user may lean against back 116. Chair 110 may be a suitable chair for use within an office space. Thus, it will be understood that the particular arrangement and assembly of chair shown in FIGS. 2 through 6 is provided by way of example only and is not intended to limit the present subject matter to any particular style, arrangement, or type of chair. Moreover, the present subject matter, including the illustrated example acoustic chair cove 100, may be used in or with other suitable chairs in alternative example embodiments.

Acoustic chair cove 100 includes a lower cove 120 and an upper cove 130. Lower cove 120 is mountable on chair 110. When acoustic chair cove 100 is mounted on chair 110, a first wing 122 of the lower cove 120 may be positioned at a first side 111 of chair 110, and a second wing 126 of the lower cove 120 may be positioned at a second side 113 of the chair 110. Thus, e.g., each of first and second wings 122, 126 may be positioned adjacent a respective one of arm rests 112. The back 116 of the chair 110 may also be received within the lower cove 120 when acoustic chair cove 100 is mounted on chair 110. Thus, e.g., when acoustic chair cove 100 is mounted on chair 110, a rear panel 124 of the lower cove 120 may be positioned adjacent the back 116 of chair 110. A top portion 121 of the lower cove 120 (e.g., at rear panel 124) may be positioned at a top portion 117 of the back 116 of the chair 119. For instance, the top portion 121 of the lower cove 120 (e.g., at rear panel 124) may be positioned no greater than twenty centimeters (20 cm) from the top portion 117 of the back 116 of the chair 119, e.g., along a vertical direction V, when acoustic chair cove 100 is mounted on chair 110. In example embodiments, lower cove 120 may be U-shaped, e.g., in a plane that is perpendicular to the vertical direction V. Thus, e.g., first wing 122, rear panel 124, and second wing 126 may mounted to one another in a U-shaped arrangement. A height of lower cove 120, e.g., along the vertical direction V, may be no less than fifty centimeters (50 cm) and no greater than one hundred and thirty centimeters (130 cm) in example embodiments.

Upper cove 130 also include a first wing 132, a rear panel 134, and a second wing 136. First wing 132 of the upper cove 130 may be positioned at first wing 122 of the lower cove 120, and second wing 136 of the upper cove 130 may be positioned at second wing 126 of the lower cove 120. Thus, e.g., each of first and second wings 132, 136 may be positioned adjacent and/or over a respective one of arm rests 112. The rear panel 134 of the upper cove 130 may be positioned adjacent the rear panel 124 of the lower cove 120. In example embodiments, upper cove 130 may be U-shaped. Thus, e.g., first wing 132, rear panel 134, and second wing 136 may mounted to one another in a U-shaped arrangement, e.g., in a plane that is perpendicular to the vertical direction V. In addition, upper cove 130 may be shaped complementary to lower cove 120 in example embodiments. For example, upper cove 130 may be nested within lower cove 120 in a retracted configuration of acoustic chair cove 100. A height of upper cove 130, e.g., along the vertical direction V, may be no less than thirty centimeters (30 cm) and no greater than one hundred centimeters (100 cm) in example embodiments.

To utilize chair 110, a worker may sit on seat 114, and the user may be partially enclosed within upper and lower coves 120, 130. Moreover, the user may enter acoustic chair cove 100 through the open front of upper and lower coves 120, 130, e.g., opposite the back 116 of chair 110. The user may be positioned between first and second wings 122, 126 of lower cove 120 and between first and second wings 132, 136 of upper cove 130 when seated on chair 110.

Upper cove 130 is mounted to lower cove 120 such that upper cove 130 is selectively movable relative to lower cove 120 between a retracted configuration (FIG. 2) and an extended configuration (FIG. 3). Moreover, as shown in FIG. 3, a top portion 131 of the upper cove 130 may move, e.g., along the vertical direction V, when upper cove 130 moves between the retracted and extended configurations. The top portion 131 of the upper cove 130 may be positioned further from the top portion 121 of the lower cove 120 in the extended configuration and may be positioned closer to the top portion 121 of the lower cove 120 in the retracted configuration. In example movements, upper cove 130 may extend upwardly along the vertical direction V from lower cove 120 by at least half of the height of lower cove 120 in the extended configuration, and upper cove 130 may be retracted along the vertical direction V into lower cove 120 such that at least eight-tenths of the height of lower cove 120 in the retracted configuration.

In example, embodiments, upper cove 130 may be manually adjustable between the retracted and extended configurations. Thus, e.g., a user may grasp upper cove 130) and lift upwardly along the vertical direction V to adjust upper cove 130 from the retracted configuration shown in FIG. 2 into the extended configuration shown in FIG. 3. Conversely, the user may grasp upper cove 130 and push downwardly along the vertical direction V to adjust upper cove 130 from the extended configuration shown in FIG. 3 into the retracted configuration shown in FIG. 2. In alternative example embodiments, acoustic chair cove 100 may include a motor operable to adjust upper cove 130 between the retracted and extended configurations. It will be understood that the retracted and extended configurations may correspond to end positions for upper cove 130 relative to lower cove 120 and that upper cove 130 may be adjusted to one or more intermediate configurations between the retracted and extended configurations in example embodiments. For instance, the extension of upper cove 130 relative to the lower cove 120 may be selected based upon a height of the person sitting within chair 110 with acoustic chair cove 100. Thus, e.g., the top portion 131 of the upper cove 130 may be positioned at or proximate a top of the head of the person sitting within chair 110, e.g., along the vertical direction V, in order to assist with providing a desired acoustic and/or visual barrier.

In the retracted configuration, upper cove 130 may be at least partially stored, e.g., within lower cove 120. Conversely, upper cove 130 may be positioned for reducing ambient sound transmission to and/or from a person sitting on chair 110 within acoustic chair cove 100 in the extended configuration. In example embodiments, the upper cove 130 may be movable by no less than fifteen centimeters (15 cm), e.g., along the vertical direction V, between the extended and retracted configurations. Moreover, the upper cove 130 may be movable by no greater than one hundred centimeters (100 cm), e.g., along the vertical direction V, between the extended and retracted configurations in example embodiments. Such range of movement may advantageously assist with reducing ambient sound transmission to and/or from a person sitting on chair 110 within acoustic chair cove 100 in the extended configuration. For instance, a head of the person sitting on chair 110 within acoustic chair cove 100 may be positioned below the top portion 131 of the upper cove 130 in the extended configuration. Conversely, the head of the person sitting on chair 110 within acoustic chair cove 100 may be positioned above the top portion 131 of the upper cove 130 in the retracted configuration. Such movement may advantageously provide acoustic and/or visual barriers when needed to facilitate work, e.g., within a shared workspace. On the other hand, upper cove 120 may be stored when not needed for sound reduction in order to encourage ambient awareness and to signal openness to collaboration.

In certain example embodiments, lower and upper coves 120, 130 may be upholstered. When upholstered, lower and upper coves 120, 130 may advantageously provide a pleasant cosmetic appearance while also facilitating sound reduction. As an example, lower and upper coves 120, 130 may be upholstered by covering lower and upper coves 120, 130 with fabric slipcovers that are removable and/or replaceable. The fabric on the interiors and/or exteriors of lower and upper coves 120, 130 may thus advantageously be selected to complement the décor of workspace 10. Moreover, the fabric on the interiors and/or exteriors of lower and upper coves 120, 130 may be easily replaceable with other fabric slipcovers.

Figure 4:
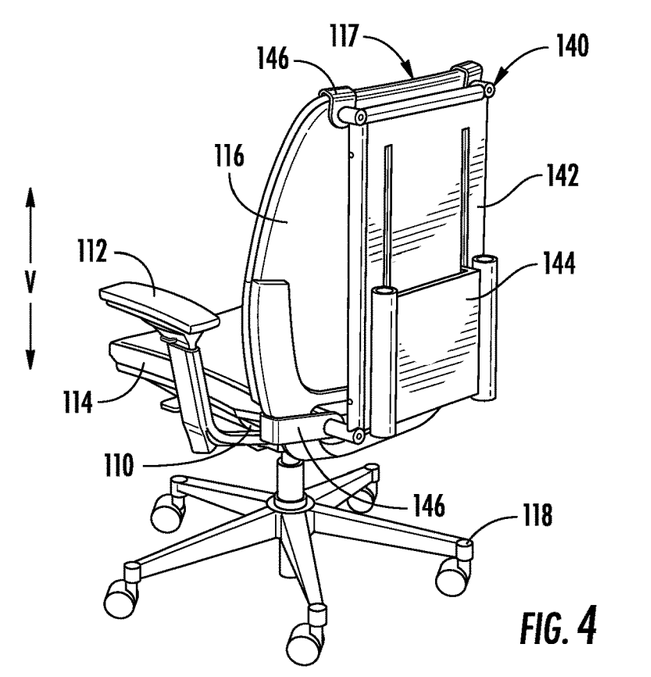
FIG. 4 is a perspective view of a chair mount assembly of the example acoustic chair cove of FIG. 2, with an upper rack shown in the retracted configuration.
Figure 5:
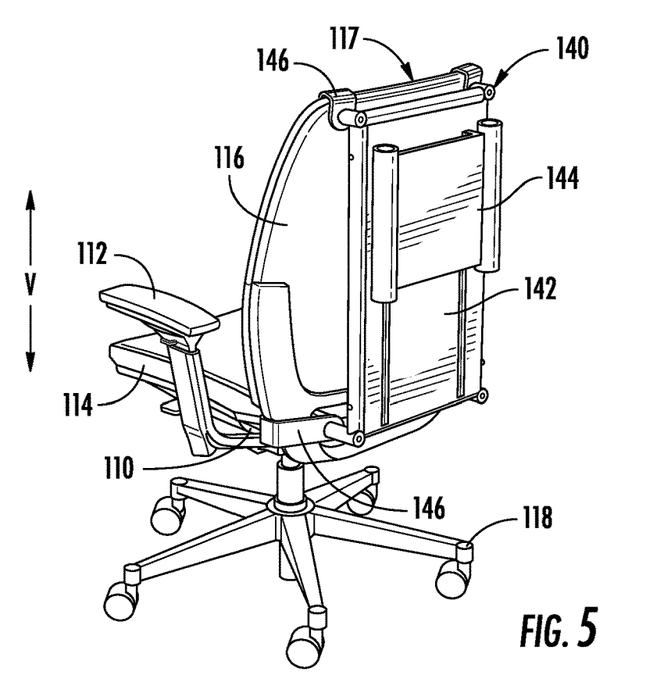
FIG. 5 is a perspective view of the chair mount assembly of FIG. 4, with the upper rack shown in the extended configuration.

Turning now to FIGS. 4 and 5, acoustic chair cove 100 may include a chair mount assembly 140. Chair mount assembly 140 may be installed on chair 110, e.g., at back 116 of chair 110. Chair mount assembly 140 may be configured for supporting lower and upper coves 120, 130 on chair 110. Moreover, chair mount assembly 140 may include a lower rack 142 and an upper rack 144. Lower rack 142 may be positioned on and mounted to chair 110. For example, lower rack 142 may be secured to back 116 of chair 110 with hooks 146. Upper rack 144 may be slidably mounted to lower rack 142. Lower cove 120 may be mounted on lower rack 142, e.g., with fasteners, hooks, brackets, etc. Upper cove 130 may mounted on upper rack 144, e.g., with fasteners, hooks, brackets, etc. Due to upper rack 144 being slidably mounted to lower rack 142, chair mount assembly 140 may allow for moving of upper cove 130 relative to lower cove 120 between the extended and retracted configurations.

Utilizing chair mount assembly 140 may facilitate mounting of acoustic chair cove 100 on various types of chairs, such as chair 110. Thus, e.g., acoustic chair cove 100 may be mounted on chairs from a variety of manufacturers, of various sizes, with various materials, etc. It will be understood that acoustic chair cove 100 may be integrated with chair in alternative example embodiments. Thus, e.g., a chair may be built with the features of acoustic chair cove 100 described above, rather than the chair being separately purchased or acquired and then installing acoustic chair cove 100 on the chair.

Figure 6:
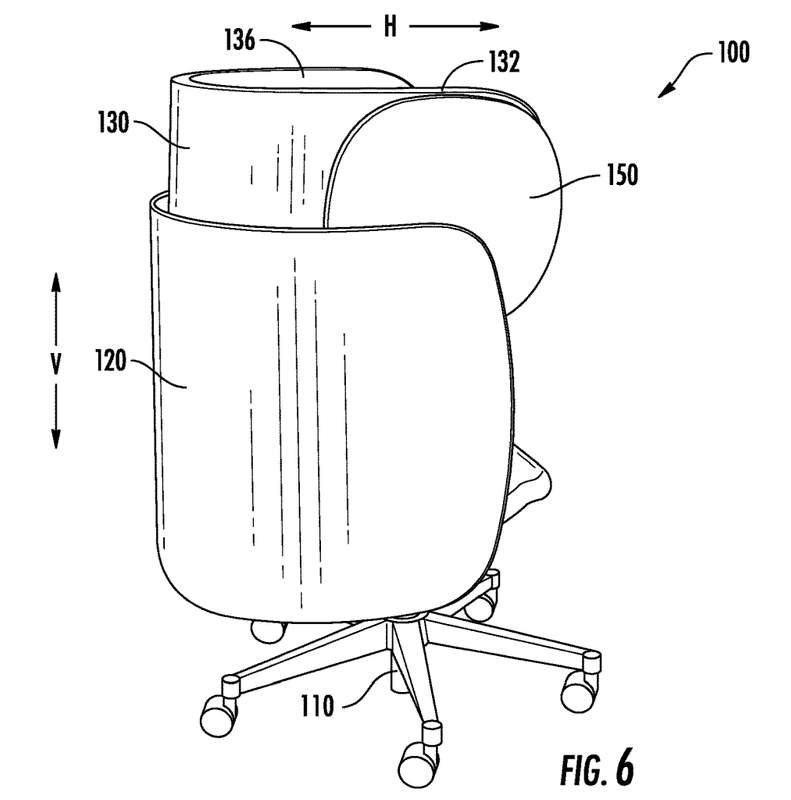
FIG. 6 is a side, elevation view of an acoustic chair cove according to another example embodiment of the present subject matter.
Figure 7:
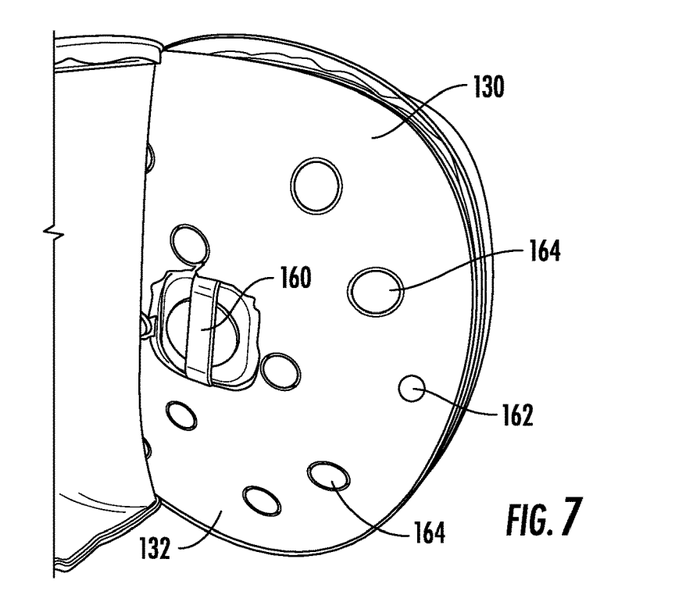
FIG. 7 is side, elevation view of certain components of the upper cove of FIG. 2.

As shown in FIG. 6, acoustic chair cove 100 may include a pair of blinds 150. While only one of blinds 150 is shown in FIG. 6, it will be understood that the other of blinds 150 may be provided at the opposite side of acoustic chair cove 100. Each of blinds 150 may be mounted to the upper cove 130, e.g., at a respective one of the first and second wings 132, 136 of the upper cove 130. A position of blinds 150, e.g., along one or both of a vertical direction V and a horizontal direction H, may be selectively adjustable. For instance, magnets (not shown) within blinds 150 may engage ferromagnetic material, such as steel discs, within upper cove 130, e.g., within first and second wings 132, 136. As shown in FIG. 6, a plurality of discs 164 may be distributed within first wing 132. A user of acoustic chair cove 100 may move blind 150 relative to first wing 132 of upper cove 130. Each of the discs 164 may correspond to a respective position for blind 150 on first wing 132. Blinds 150 may advantageously provide additional acoustic and/or visual barriers adjustability for acoustic chair cove 100.

As shown in FIG. 6, acoustic chair cove 100 may further include a speaker 160 and a microphone 162. Moreover, in certain example embodiments, acoustic chair cove 100 may include a pair of speakers 160 and/or a pair of microphones 162. Each of the pair of speakers 160 may be disposed within a respective one the first and second wings 132, 136 of upper cove 130. Similarly, each of the pair of microphones 162 may be disposed within a respective one the first and second wings 132, 136 of upper cove 130. Acoustic chair cove 100 may include one or more batteries or power cables (not shown) to provide electrical power to speaker 160 and microphone 162. The speaker 160 and microphone 162 may be connected to a desktop, laptop, smartphone, or other sound source for facilitating calls and/or video conferencing in acoustic chair cove 100.

Speaker 160 may be positioned and configured to emit sound within acoustic chair cove 100. For example, when upper cove 130 is in the extended configuration, speaker 160 may be positioned at or adjacent a head of the person sitting on chair 110 within acoustic chair cove 100, e.g., along the vertical direction V. Thus, speaker 160 may be positioned and configured to emit sound to a worker sitting in the chair 110. Moreover, the speaker 160 may emit sound to the worker during a call or video conference. In example embodiments, the speaker 160 may be positioned no less than fifteen centimeters (15 cm) from the top portion 131 of the upper cove 130 along the vertical direction V and/or from the front edge of the upper cove 130.

Microphone 162 may be positioned and configured to collect sound within acoustic chair cove 100. For example, when upper cove 130 is in the extended configuration, microphone 162 may be positioned at or adjacent a head of the person sitting on chair 110 within acoustic chair cove 100, e.g., along the vertical direction V. Thus, microphone 162 may be positioned and configured to collect sound generated by a worker sitting in the chair 110. Moreover, the microphone 162 may collect the voice of the worker during a call or video conference.

As noted above, the acoustic chair cove 100 may provide selective acoustic and/or visual barriers by adjusting upper cove 130 between the extended and retracted configurations. In the extended configuration, upper cove 130 may advantageously limit transmission of ambient noise around chair 110 to a person sitting on chair 110 within acoustic chair cove 100. Thus, e.g., the person within chair 110 may be less distracted by noisy coworkers when upper cove 130 is in the extended configuration. In addition, upper cove 130 may advantageously limit transmission of noise from a person sitting on chair 110 within acoustic chair cove 100 to others located around the chair 110. Thus, e.g., a person sitting on chair 110 within acoustic chair cove 100 may move upper cove 130 into the extended configuration during a call or video conference in order to reduce transmission to others located around the chair 110. By facilitating calls and video conferences from chair 110, demand for conference space 40 may advantageously be reduced.

As may be seen from the above, the present subject matter may provide an acoustic chair cove. The acoustic chair cove may advantageously facilitate calls and video conference within shared workspaces and thus advantageously reduce demand for meeting or conference rooms. The acoustic chair cove may be adjustable between retracted and extended configurations. The acoustic chair cove may be normally positioned in the retracted configuration in order to encourage ambient awareness and to signal openness to collaboration. By adjusting to the extended configuration, the acoustic chair cove may provide increased visual and acoustic protection during deep focus or during calls or video conferences.

In an experimental arrangement, the sound level drop at about one hundred and fifty centimeters (150 cm) from a center of a chair with the acoustic chair cove, which generally corresponds to the sound at a desk adjacent to the chair with the acoustic chair cove, was measured. The sound level drop was measured both when sound was emitted by speakers of the acoustic chair cove and when sound was from a talker within the acoustic chair cove. When sound was emitted by the speakers, the upper cove in the extended configuration provided acoustic attenuation for neighboring desks. Similarly, when sound was from a talker within the acoustic chair cove, the upper cove in the extended configuration also provided acoustic attenuation for neighboring desks. For instance, the upper cove in the extended configuration may provide a one, two, or more decibel increase in the sound level drop relative to when the upper cove in the retracted configuration.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

EXAMPLE EMBODIMENTS

First example embodiment: An acoustic chair cove, comprising: a lower cove mountable on a chair such that a first wing of the lower cove is positioned at a first side of the chair, a second wing of the lower cove is positioned at a second side of the chair, and a top portion of the lower cove is positioned at a top portion of a back of the chair: and an upper cove mounted to the lower cove such that the upper cove is selectively movable relative to the lower cove between a retracted configuration and an extended configuration, wherein a top portion of the upper cove is positioned further from the top portion of the lower cove in the extended configuration and is positioned closer to the top portion of the lower cove in the retracted configuration.

Second example embodiment: The system of the first example embodiment, wherein the lower and upper coves are U-shaped in a plane perpendicular to a vertical direction.

Third example embodiment: The system of either of the first example embodiment or the second example embodiment, wherein the upper cove is nested within the lower cove in the retracted configuration.

Fourth example embodiment: The system of any one of the first through third example embodiments, wherein the back of the chair is received within the lower cove when the lower cove is mounted on the chair.

Fifth example embodiment: The system of any one of the first through fourth example embodiments, wherein the upper cove is movable by no less than fifteen centimeters between the extended and retracted configurations.

Sixth example embodiment: The system of any one of the first through fifth example embodiments, wherein the upper cove comprises a first wing and a second wing, the first wing of the upper cove positioned proximate the first wing of the lower cove, the second wing of the upper cove positioned proximate the second wing of the lower cove.

Seventh example embodiment: The system of the sixth example embodiment, further comprising a pair of blinds, each of the pair of blinds mounted to the upper cove at a respective one of the first and second wings of the upper cove.

Eighth example embodiment: The system of the seventh example embodiment, wherein a position of each of the pair of blinds on the respective one of the first and second wings of the upper cove is selectively adjustable.

Ninth example embodiment: The system of any one of the sixth through eighth example embodiments, further comprising a pair of speakers, each of the pair of speakers disposed within a respective one of the first and second wings of the upper cove.

Tenth example embodiment: The system of any one of the sixth through ninth example embodiments, further comprising a microphone disposed within one of the first and second wings of the upper cove.

Eleventh example embodiment: The system of any one of the first through tenth example embodiments, wherein the upper cove is configured for attenuating sound from around the acoustic chair cove in the extended configuration.

Twelfth example embodiment: An acoustic chair assembly, comprising: a chair: a U-shaped lower cove mounted on the chair such that a first wing of the lower cove is positioned at a first side of the chair, a second wing of the lower cove is positioned at a second side of the chair, and a top portion of the lower cove is positioned at a top portion of a back of the chair: and a U-shaped upper cove mounted to the lower cove such that the upper cove is selectively movable relative to the lower cove between a retracted configuration and an extended configuration, wherein the upper cove is movable by no less than fifteen centimeters between the extended and retracted configurations.

Thirteenth example embodiment: The acoustic chair assembly of the twelfth example embodiment, wherein the upper cove is nested within the lower cove in the retracted configuration.

Fourteenth example embodiment: The acoustic chair assembly of either the twelfth example embodiment or the thirteenth example embodiment, wherein the back of the chair is received within the lower cove.

Fifteenth example embodiment: The acoustic chair assembly of any one of the twelfth through fourteenth example embodiments, wherein the upper cove comprises a first wing and a second wing, the first wing of the upper cove positioned proximate the first wing of the lower cove, the second wing of the upper cove positioned proximate the second wing of the lower cove.

Sixteenth example embodiment: The acoustic chair assembly of the fifteenth example embodiment, further comprising a pair of blinds, each of the pair of blinds mounted to the upper cove at a respective one of the first and second wings of the upper cove.

Seventeenth example embodiment: The acoustic chair assembly of the sixteenth example embodiment, wherein a position of each of the pair of blinds on the respective one of the first and second wings of the upper cove is selectively adjustable.

Eighteenth example embodiment: The acoustic chair assembly of any one of the fifteenth through seventeenth example embodiments, further comprising a pair of speakers, each of the pair of speakers disposed within a respective one of the first and second wings of the upper cove.

Nineteenth example embodiment: The acoustic chair assembly of any one of the fifteenth through eighteenth example embodiments, further comprising a microphone disposed within one of the first and second wings of the upper cove.

Twentieth example embodiment: The acoustic chair assembly of any one of the twelfth through nineteenth example embodiments, wherein the upper cove is configured for attenuating sound from around the acoustic chair assembly in the extended configuration.

What is claimed is:

1. An acoustic chair cove, comprising:
    a chair mount assembly comprising a lower rack and an upper rack, the lower rack mountable at a back of a chair, the upper rack slidably mounted to the lower rack;
    a lower cove mounted to the lower rack such that a first wing of the lower cove is positioned at a first side of the chair, a second wing of the lower cove is positioned at a second side of the chair, and a top portion of the lower cove is positioned at a top portion of the back of the chair; and
    an upper cove mounted to the upper rack such that the upper cove is selectively movable relative to the lower cove between a retracted configuration, one or more intermediate configurations, and an extended configuration on the upper rack,
    wherein a top portion of the upper cove is positioned further from the top portion of the lower cove in the extended configuration and is positioned closer to the top portion of the lower cove in the retracted configuration.

2. The acoustic chair cove of claim 1, wherein the lower and upper coves are U-shaped in a plane perpendicular to a vertical direction.

3. The acoustic chair cove of claim 1, wherein the upper cove is nested within the lower cove in the retracted configuration.

4. The acoustic chair cove of claim 1, wherein the back of the chair is received within the lower cove when the lower cove is mounted on the chair, and the lower rack is mountable to the back of the chair with a plurality of hooks.

5. The acoustic chair cove of claim 1, wherein the upper cove is movable by no less than fifteen centimeters between the extended and retracted configurations.

6. The acoustic chair cove of claim 1, wherein the upper cove comprises a first wing and a second wing, the first wing of the upper cove positioned proximate the first wing of the lower cove, the second wing of the upper cove positioned proximate the second wing of the lower cove.

7. The acoustic chair cove of claim 6, further comprising a pair of blinds, each of the pair of blinds mounted to the upper cove at a respective one of the first and second wings of the upper cove.

8. The acoustic chair cove of claim 7, wherein a position of each of the pair of blinds on the respective one of the first and second wings of the upper cove is selectively adjustable.

9. The acoustic chair cove of claim 6, further comprising a pair of speakers, each of the pair of speakers disposed within a respective one of the first and second wings of the upper cove.

10. The acoustic chair cove of claim 9, further comprising a microphone disposed within one of the first and second wings of the upper cove.

11. An acoustic chair assembly, comprising:
a chair;
a chair mount assembly comprising a lower rack and an upper rack, the lower rack mounted at a back of the chair with a plurality of hooks, the upper rack slidably mounted to the lower rack;
a U-shaped lower cove mounted on the lower rack such that a first wing of the lower cove is positioned at a first side of the chair, a second wing of the lower cove is positioned at a second side of the chair, and a top portion of the lower cove is positioned at a top portion of the back of the chair; and
a U-shaped upper cove mounted to the upper rack such that the upper cove is selectively movable relative to the lower cove between a retracted configuration, one or more intermediate configurations, and an extended configuration,
wherein the upper cove is movable by no less than fifteen centimeters between the extended and retracted configurations.

12. The acoustic chair assembly of claim 11, wherein the upper cove is nested within the lower cove in the retracted configuration.

13. The acoustic chair assembly of claim 11, wherein the back of the chair is received within the lower cove.

14. The acoustic chair assembly of claim 11, wherein the upper cove comprises a first wing and a second wing, the first wing of the upper cove positioned proximate the first wing of the lower cove, the second wing of the upper cove positioned proximate the second wing of the lower cove.

15. The acoustic chair assembly of claim 14, further comprising a pair of blinds, each of the pair of blinds mounted to the upper cove at a respective one of the first and second wings of the upper cove.

16. The acoustic chair assembly of claim 15, wherein a position of each of the pair of blinds on the respective one of the first and second wings of the upper cove is selectively adjustable.

17. The acoustic chair assembly of claim 14, further comprising a pair of speakers, each of the pair of speakers disposed within a respective one of the first and second wings of the upper cove.

18. The acoustic chair assembly of claim 17, further comprising a microphone disposed within one of the first and second wings of the upper cove.

19. The acoustic chair assembly of claim 11, wherein the upper cove is configured for attenuating sound from around the acoustic chair assembly in the extended configuration.

20. An acoustic chair cove, comprising:
a lower cove mountable on a chair such that a first wing of the lower cove is positioned at a first side of the chair, a second wing of the lower cove is positioned at a second side of the chair, and a top portion of the lower cove is positioned at a top portion of a back of the chair;
an upper cove mounted to the lower cove such that the upper cove is selectively movable relative to the lower cove between a retracted configuration and an extended configuration, the upper cove comprising a first wing and a second wing, the first wing of the upper cove positioned proximate the first wing of the lower cove, the second wing of the upper cove positioned proximate the second wing of the lower cove; and
a pair of blinds, each of the pair of blinds mounted to the upper cove at a respective one of the first and second wings of the upper cove, a position of each of the pair of blinds on the respective one of the first and second wings of the upper cove being selectively adjustable,
wherein a top portion of the upper cove is positioned further from the top portion of the lower cove in the extended configuration and is positioned closer to the top portion of the lower cove in the retracted configuration.

* * * * *